(12) United States Patent
Raghuvanshi

(10) Patent No.: US 7,644,294 B2
(45) Date of Patent: Jan. 5, 2010

(54) DYNAMICALLY SELF-DECAYING DEVICE ARCHITECTURE

(75) Inventor: Preetham Raghuvanshi, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 421 days.

(21) Appl. No.: 11/327,606

(22) Filed: Jan. 6, 2006

(65) Prior Publication Data

US 2007/0162775 A1   Jul. 12, 2007

(51) Int. Cl.
G06F 1/32 (2006.01)
(52) U.S. Cl. .................................. 713/324; 713/320
(58) Field of Classification Search .................. 713/320, 713/324
See application file for complete search history.

(56) References Cited

U.S. PATENT DOCUMENTS

| | | | |
|---|---|---|---|
| 5,953,237 A | 9/1999 | Indermaur et al. | |
| 6,301,671 B1 * | 10/2001 | Boice et al. | 713/322 |
| 6,976,182 B1 | 12/2005 | Filippo | |
| 2004/0044901 A1 * | 3/2004 | Serkowski et al. | 713/200 |

FOREIGN PATENT DOCUMENTS

WO    WO 2005/069123    7/2005

OTHER PUBLICATIONS

International Search Report; International Application No. PCT/US2006/047682; International Filing Date: Dec. 14, 2006; Mailed on Feb. 12, 2008.
Written Opinion of the International Searching Authority; International Application No. PCT/US2006/047682; International Filing Date: Dec. 14, 2006; Mailed on Feb. 12, 2008.

* cited by examiner

Primary Examiner—Tse Chen
(74) Attorney, Agent, or Firm—Rory D. Rankin; Meyertons Hood Kivlin Kowert & Goetzel, P.C.

(57) ABSTRACT

A power management method and mechanism for dynamically determining which of a plurality of blocks of an electrical device may be powered on or off. A device is contemplated which includes one or more power manageable groups. A power management unit associated with the apparatus is configured to detect instructions which are scheduled for execution, identify particular power group(s) which may be required for execution of the instruction, and convey an indication which prevents the particular power group(s) from entering a powered off state, in response to detecting said instruction. If the power management unit does not detect an incoming or pending instructions, for a predetermined period of time, which requires a particular power group(s) for execution, the power management unit may convey an indication which causes or permits the corresponding power group(s) to enter a powered off state. A power group may automatically decay to a powered off state in the absence of a detected instruction requiring the power group. Instructions may be encoded to identify required power groups.

15 Claims, 7 Drawing Sheets

| Power Group 602 | Power Code ID 604 |
|---|---|
| AGU, Load/Store | 00000001 |
| ALU | 00000010 |
| Shifter | 00000100 |
| Integer Multiplier | 00001000 |
| FP Scheduler | 00010000 |
| FP Adder | 00100000 |
| FP Multiplier | 01000000 |
| FP Divide/Squareroot | 10000000 |

600

| instruction 612 | | power code 614 | other bits 616 |
|---|---|---|---|
| addop | register, memory | 00000011 | 11001011000... |
| moveop | register, register | 00000010 | 10100011110... |
| . | | | |
| . | | | |
| fpaddop | fpregister, memory | 00110001 | 0110100010... |
| Pending | | 00110011 | |

| Power Group 602 | Power Code ID 604 |
|---|---|
| AGU, Load/Store | 00000001 |
| ALU | 00000010 |
| Shifter | 00000100 |
| Integer Multiplier | 00001000 |
| FP Scheduler | 00010000 |
| FP Adder | 00100000 |
| FP Multiplier | 01000000 |
| FP Divide/Squareroot | 10000000 |

| instruction 612 | power code 614 | other bits 616 |
|---|---|---|
| addop  register, memory | 00000011 | 11001011000... |
| moveop register, register | 00000010 | 10100011110... |
| ... | | |
| fpaddop fpregister, memory | 00110001 | 0110100010... |

| Pending |
|---|
| 00110011 |

DYNAMICALLY SELF-DECAYING DEVICE ARCHITECTURE

BACKGROUND OF THE INVENTION

1. Field of the Invention

This invention is related to the field of processors and computer systems and, more particularly, to power management in processors and other devices.

2. Description of the Related Art

While processing performance in computing and other devices has garnered much attention, the topic of power dissipation has become increasingly important. Generally speaking, the public has come to expect their computing devices to be smaller and more mobile. Whether the device is a portable computer, cell phone, personal digital assistant (PDA), or otherwise, portable power sources such as batteries are becoming commonplace. Given that such power supplies are limited in nature, it is extremely important that the power which is available be used in an efficient manner. Consequently, power management techniques in such devices are becoming more widespread. Further, as gate sizes in processors and other computing devices become smaller and smaller, it is projected that static power dissipation may soon equal dynamic power dissipation. Hence static power dissipation is increasingly becoming a crucial design consideration in processor and device architectures.

In view of the importance of managing power in these devices, effective power management methods and mechanisms are desired.

SUMMARY OF THE INVENTION

Methods and mechanisms for managing power in computing devices are contemplated.

A method and mechanism are contemplated wherein only relevant logic blocks of a device are active. Blocks which are not needed are powered off and clocking to the unneeded blocks may be stopped. The method and mechanism dynamically determines how and when various logical units be allowed to operate or be switched off.

An device is contemplated which includes one or more power manageable groups. A power management unit associated with the device is configured to detect instructions which are scheduled for execution, identify a particular power group which may be required for execution of an instruction, and convey an indication which prevents the particular power group from entering a powered off state, in response to detecting said instruction. If the power management unit does not detect an incoming or pending instructions, for a predetermined period of time, which requires a particular power group for execution, the power management unit may convey an indication which causes or permits the corresponding power group to enter a powered off state. In addition to disabling power for a given power group, clocking may be disabled as well.

Also contemplated is a device in which power manageable groups may be partitioned into portions which may be powered off, and portions which may not be powered off. In such an embodiment, when it is determined that a given power group may be powered off, only the portion of the power group which may be powered off is powered off. The remaining portion(s) may then remain powered. In an alternative embodiment, portions of a power group which may not be powered off, may enter a reduced power state which allows the portion to maintain a state of the portion.

Also contemplated is a power management unit which is configured to maintain a count for each power manageable group. Each cycle of a received clock, the counts may be decremented. Should a count reach zero, then a signal may be conveyed which indicates the corresponding power group may be placed in a powered off state. If an instruction is detected which may require a particular power group for execution, then the count for that power group may be reset to a non-zero value. In one embodiment, counts may naturally "decay" in the absence of a resetting signal. Accordingly, power groups may automatically decay to a powered off, or reduced power, state. In various embodiment, power groups may be configured to convey a status indication which prevents the first power group from entering a powered off state.

In one embodiment, instructions are associated with power codes that indicate which power groups may be required for execution. Instruction opcodes may be encoded to identify one or more power groups which may be required for execution. Alternatively, instructions may be mapped to power codes via a mapping mechanism.

BRIEF DESCRIPTION OF THE DRAWINGS

The following detailed description makes reference to the accompanying drawings, which are now briefly described.

FIG. 6 illustrates one embodiment of device instructions and power code encodings.

Figure 1:
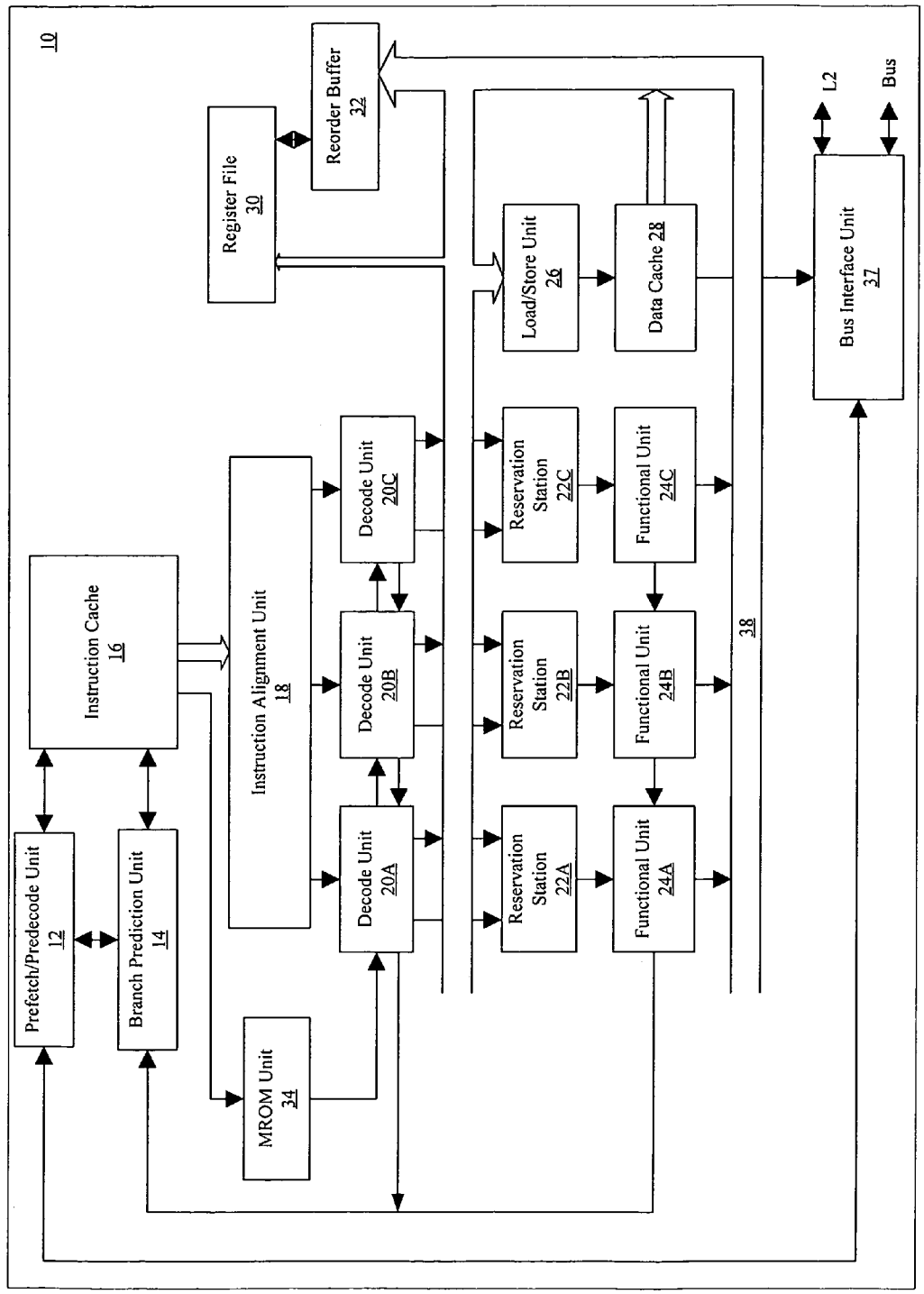
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A-20C, a plurality of reservation stations 22A-22C, a plurality of functional units 24A-24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A-20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A-20C is coupled to load/store unit 26 and to respective reservation stations 22A-22C. Reservation stations 22A-22C are further coupled to respective functional units 24A-24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 may generate predecode data corresponding to the instructions. For example, in one embodiment, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34. Still further, prefetch/predecode unit 12 may be configured to detect branch instructions and to store branch prediction information corresponding to the branch instructions into branch prediction unit 14. Other embodiments may employ any suitable predecode scheme or no predecode, as desired.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order. In some embodiments, (e.g. embodiments employing fixed-length instruction sets), the instruction alignment unit 18 may be eliminated.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A-24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The decoded instructions provided at the outputs of decode units 20 are routed directly to respective reservation stations 22. In one embodiment, each reservation station 22 is capable of holding instruction information (e.g. decoded instructions as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. The register file 30 comprises storage locations for each of the architected registers included in the instruction set implemented by the processor 10. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing-instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A-22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A-24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have accessed data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem (although the transfer may be accomplished in the data cache 28). Memory operations may be the result of an instruction which utilizes an operand stored in memory, or may be the result of a load/store instruction which causes the data transfer but no other operation.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

It is noted that, while the embodiment of FIG. 1 is a superscalar implementation, other embodiments may employ scalar implementations. Furthermore, the number of functional units may be varied from embodiment to embodiment. Any execution circuitry for executing fast path and microcode (e.g. MROM) instructions may be used. Other embodiments may use a centralized reservation station rather than the individual reservation stations shown in FIG. 1. Furthermore, other embodiments may employ a central scheduler rather than the reservation stations and reorder buffer shown in FIG. 1.

Figure 2:
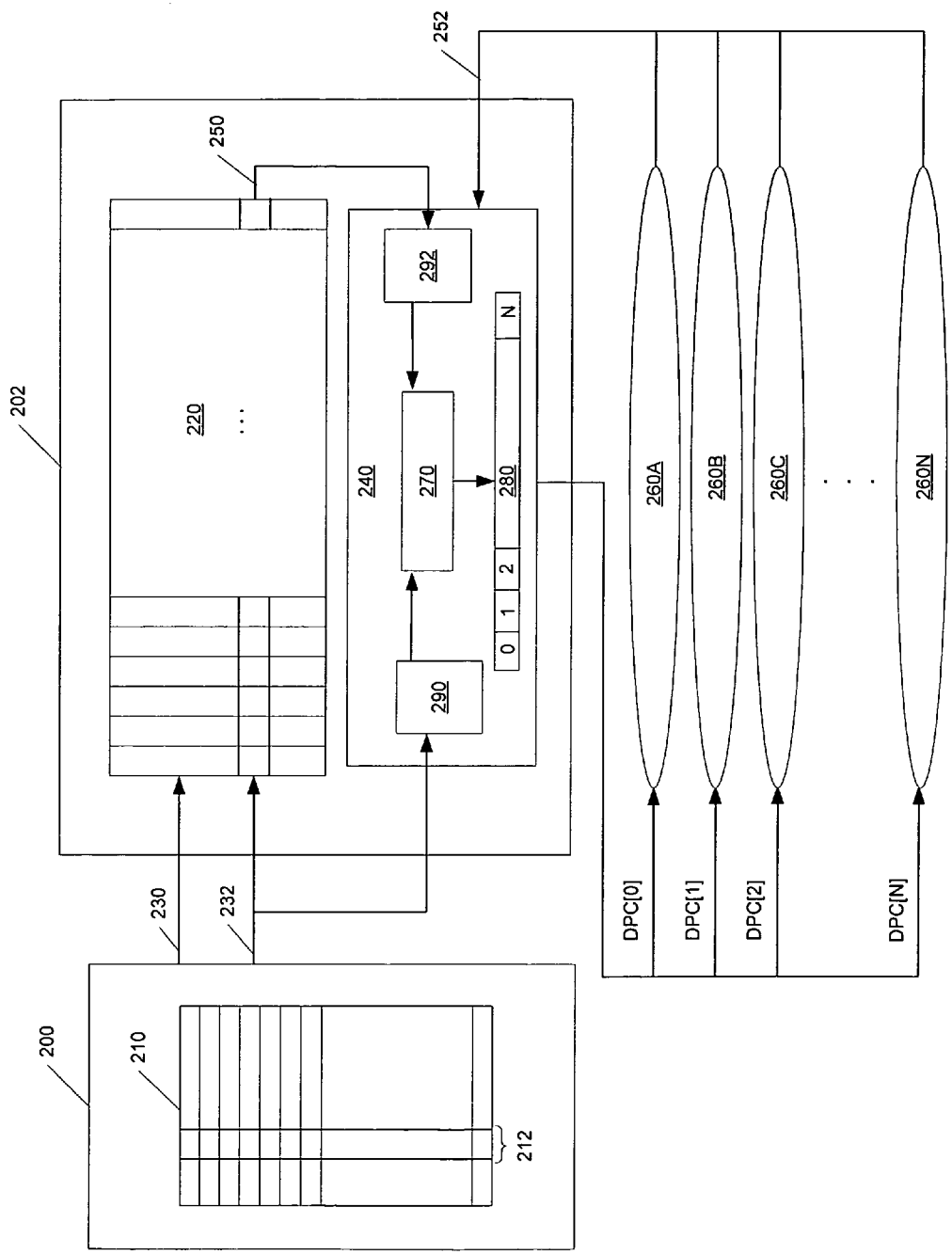
FIG. 2 is a block diagram of one embodiment of a portion of the processor shown in FIG. 1.

Turning now to FIG. 2, one embodiment of a power management mechanism which may be utilized in a device such as the above described processor is shown. In the following, a microinstruction based method and mechanism are used for purposes of discussion. However, the described methods and mechanisms may be utilized in non-microinstruction based systems as well.

In the example shown, a microcode unit 200 and microinstruction control unit 202 are shown. It is noted that the microcode unit 200 and microinstruction control unit 202 may generally correspond to the MROM unit 34 described above. However, in other embodiments, the units (200, 202) may comprise circuitry separate from that of MROM unit 34. Microcode unit 200 includes a memory 210 comprising a plurality of entries, each of which may be configured to store a microinstruction. Memory 210 may, for example, comprise a read only memory (ROM) or any other suitable storage device. Control unit 202 is shown to include a reorder buffer 220 and dynamic power control unit 240. In addition to the microcode unit 200, and control unit 202, power groups 260A-260N are shown. In one embodiment, a power group may generally correspond to a collection of power manageable blocks of logical unit(s) or circuitry. Power manageable typically means that the Vdd supply and/or clocking may be dynamically turned off or on. For example, power group 260A may correspond to an address generation unit and/or a load store unit, power group 260B may correspond to an arithmetic logic unit, power group 260C may correspond to a shifter, power group 260N may correspond to a portion of a floating point unit, and so on.

In one embodiment, microinstructions may be coded such that they indicate which of one or more power groups 260 are required for execution. If it is detected that a microinstruction requiring a particular power group is in the pipeline or will otherwise require the use of a particular power group, then control unit 202 may cause the corresponding power group(s) to remain or become active. If no such microinstruction is detected, then a given power group may be allowed to enter a low(er) power state. As used herein, a low power state may generally include an off or non-powered state, unless otherwise indicated.

In one embodiment, particular power groups 260 may automatically enter a lower power state in the absence of some indication which prevents if from entering a lower power state. In such an embodiment, power groups may be said to automatically "decay" over time with respect to power consumption. If it is determined or believed that a given power group may be needed, then an indication may be conveyed to the power group which in effect "refreshes" it to a less decayed state. For example, a power group 260 may be configured to automatically enter a low power state if it is not in use and no refresh signal has been received within a predetermined period of time. If the refresh signal is detected, the predetermined period of time may be "restarted".

In the embodiment shown, memory 210 generally comprises a table with a plurality of rows, with a given row storing data corresponding to one (possibly more) microinstruction. As used herein, the terms "microinstruction" and "instruction" may be used interchangeably. Generally speaking, data corresponding to a given instruction may comprise one or more fields which identify a particular operation, register, memory location or otherwise. In addition, the data for a given instruction may further include a power code field 212 which may be used to indicate one or more power groups which may be required for execution of the corresponding instruction. In alternative embodiments, data within power code field 212 may be generated during instruction decode or elsewhere within a processing mechanism. In an embodiment wherein the memory 200 and/or control unit 202 are part of MROM unit 34, memory 200 may be configured to convey one or more instructions from memory 200 to control unit 202 in response to an indication from instruction cache 16. As described above, certain instructions (e.g., MROM instructions) in a processor may be deemed to be too complex for decode by decode units 20. As such, MROM instructions are executed by invoking MROM unit 34 which then issues two or more other instructions for use in effectuating the desired operation.

In one embodiment, reorder buffer 220 includes a plurality of entries, each of which is configured to store data to an instruction received from memory 200. In the example shown, an instruction and other data may be conveyed to reorder buffer 220 via a bus 230, while a corresponding power code is conveyed to both reorder buffer 220 and dynamic power control unit 240 via a bus 232. Dynamic power control unit 240 includes a unit 280 which is configured to store an indication for each of one or more power groups 260. Each indication in the unit 280 is configured to indicate whether or not a corresponding power group may enter a low power state. For example, unit 280 may comprise entries 0-N, each of which corresponds to a power group 260. In addition, each power group 260 may receive a corresponding indication DPC[0]-DPC-[N] which indicates a power state for the power group. Also included in dynamic power control unit 240 is circuitry (290, 292, and 270) which is utilized to update a contents of unit 280. In one embodiment, circuitry 290 may receive an indication via bus 232 corresponding to an "incoming" instruction, while bus 250 may be utilized to convey an indication to circuitry 292 corresponding to a "pending" instruction. In addition, power groups 260 are further coupled to convey an indication of status to dynamic power control unit 240 via bus 252. As used herein, an instruction may be said to be scheduled for execution when it has either been detected as incoming and/or pending.

Generally speaking, an indication received via either bus 232 or 250 may identify one or more power groups 260 which may be required for execution of a corresponding instruction. If an indication corresponding to a particular power group 260A-260N is received, then unit 280 may be updated to indicate the corresponding power group 260 is to be or remain powered on and/or clocked (or alternatively, is not allowed to enter a low power state). For example, in one embodiment, unit 280 may comprise a global counter wherein each entry of unit 280 may correspond to at least one of power groups 260 and may comprise a count whose value is decremented each clock cycle. In response to detecting an incoming 232 and/or pending 250 indication corresponding to a power group, a control unit 270 may cause the count for the corresponding power group to be reset to a nonzero value. In addition, control unit 270 may prevent the count from being decremented while an instruction corresponding to a give power group is pending (e.g., in reorder buffer 220). A power group 260 whose count reaches zero may enter (or be allowed to enter) a low(er) power state. A count within unit 280 which reaches zero generally indicates that no power code corresponding to an incoming or a pending instruction has been detected for a predetermined period of time. For example, if each count in unit 280 comprises two bits, and the detection of an incoming or pending instruction power code causes both bits to be set to the binary value "1" (i.e., the count value is three), then decrementing the count value three times will cause the count to equal zero which may be used to either cause (or otherwise allow) the corresponding power group to enter a low power state. Of course, the method and mechanism may perform incrementing as opposed to decrementing, and may indicate a lower power state is caused or permitted responsive to detecting a corresponding count is equal to or greater than a predetermined maximum value. In such an embodiment, counts may be reset by control unit 270 to zero.

Figure 3:
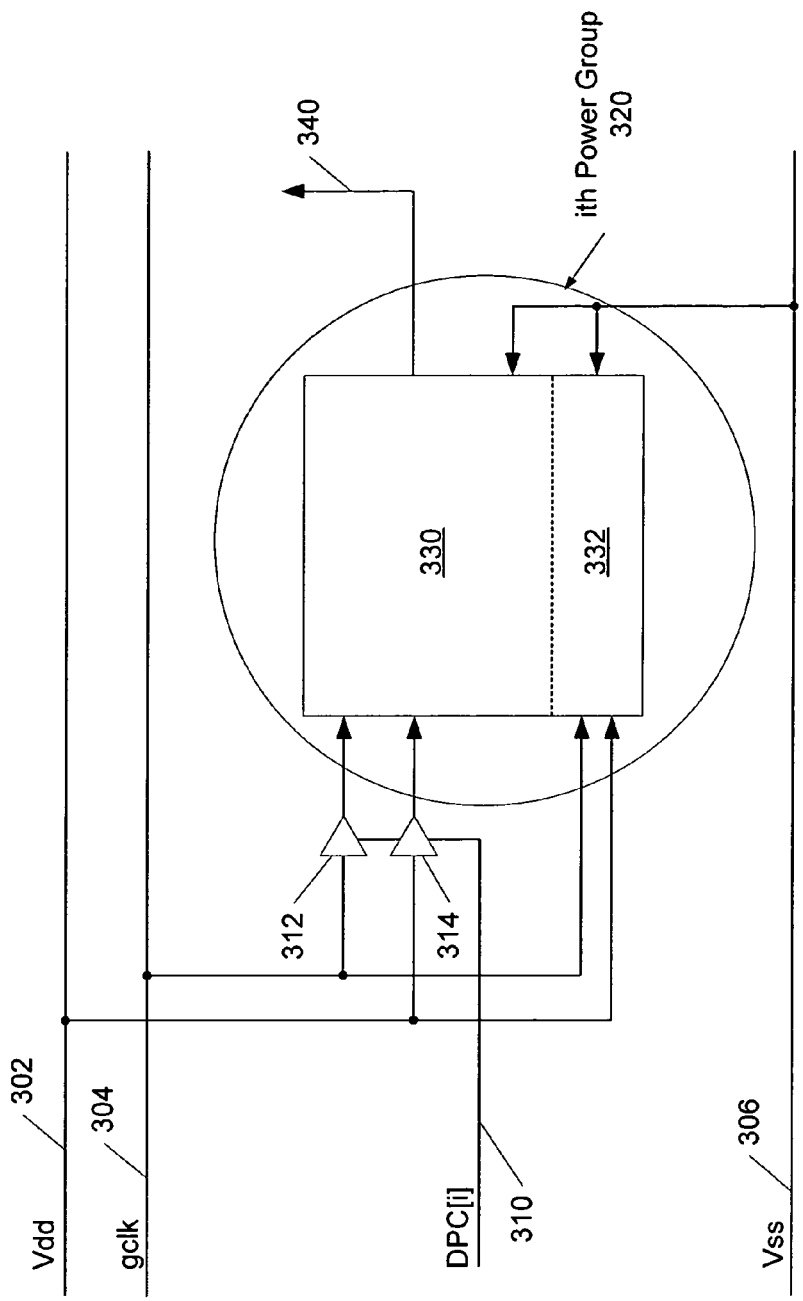
FIG. 3 depicts a portion of a power management mechanism.

FIG. 3 illustrates one embodiment of a power group 320 and a corresponding power state indication 310. Power group 320 may generally correspond to one of the power groups 260 depicted in FIG. 2, and power state indication 310 may generally corresponds to an indication conveyed from the dynamic power control unit 240 shown in FIG. 2. In one embodiment, power groups may be logically partitioned into two or more groups which each have different power management requirements. In the example shown, power group 320 is partitioned into a first group 330 which is power managed, and a second group 332 which is not power managed. In one embodiment, the first group 330 may comprise registers, combinational logic, and/or sequential logic which may be power managed, while the other group 332 comprises registers and/or logic which may not be power managed. Logic which may not be powered off may generally comprise logic which is required to retain some type of state.

As shown in the example of FIG. 3, a voltage supply 302 is available, and a ground supply 306 is available. In addition, a clk source (gclk) 304 is provided. Clock source gclk 304 may, for example, comprise a synchronous global clock. In one embodiment, voltage supply is coupled to the first group via a first gate 312, and is also coupled to the second group 332. Similarly, gclk 304 is coupled to the first group via a gate 314, and is coupled to the second group 332. Ground supply 306 is also shown coupled to both groups (330, 332). Power state indication (DPC[i]) 310 is coupled to each of gates 312 and 314. Gates 312 and 314 may comprise tri-state gates, or other circuitry, which may be used to control whether or not voltage supply 302 and/or gclk 304 are provided to the first group 330. For example, power state indication 310 may comprise an enable signal which is utilized to either enable or disable output from each of gates 312 and 314. Enabling the output of gate 312 will cause the first group 330 to be powered, and enabling the output of gate 314 will cause the first group 330 to be clocked. In one embodiment, power state signal 310 may simply comprise the count for the corresponding power group as described above in FIG. 2. If any bit of the count is non-zero, then the corresponding gate (312, 314) is enabled. Otherwise, output from the corresponding gate (312, 314) may be disabled. Of course, numerous variations as to how signal 310 may control circuits 312 and 314 are possible and are contemplated.

In addition to the above, power group 320 is also shown to convey a status indication 340. Status indication may generally be conveyed to the dynamic power control unit 240 of FIG. 2. Status indication 340 may be used to indicate when power group 320 may be powered off. For example, while a power group 320 is performing operations, status signal 340 may indicate it requires power and/or clocking.

As described above, some portion of a power group may be power managed while another portion is not. In the example of FIG. 3, a second group 332 within power group 340 was configured to be powered and/or clocked at all times. Such may be required because it is necessary for group 332 to retain a state. In an alternative embodiment, a portion of a power group which may not have its power and/or clock removed, may have its power state reduced. In this manner, circuitry may be configured to reduce its power usage and/or leakage while still retaining its state.

Figure 4:
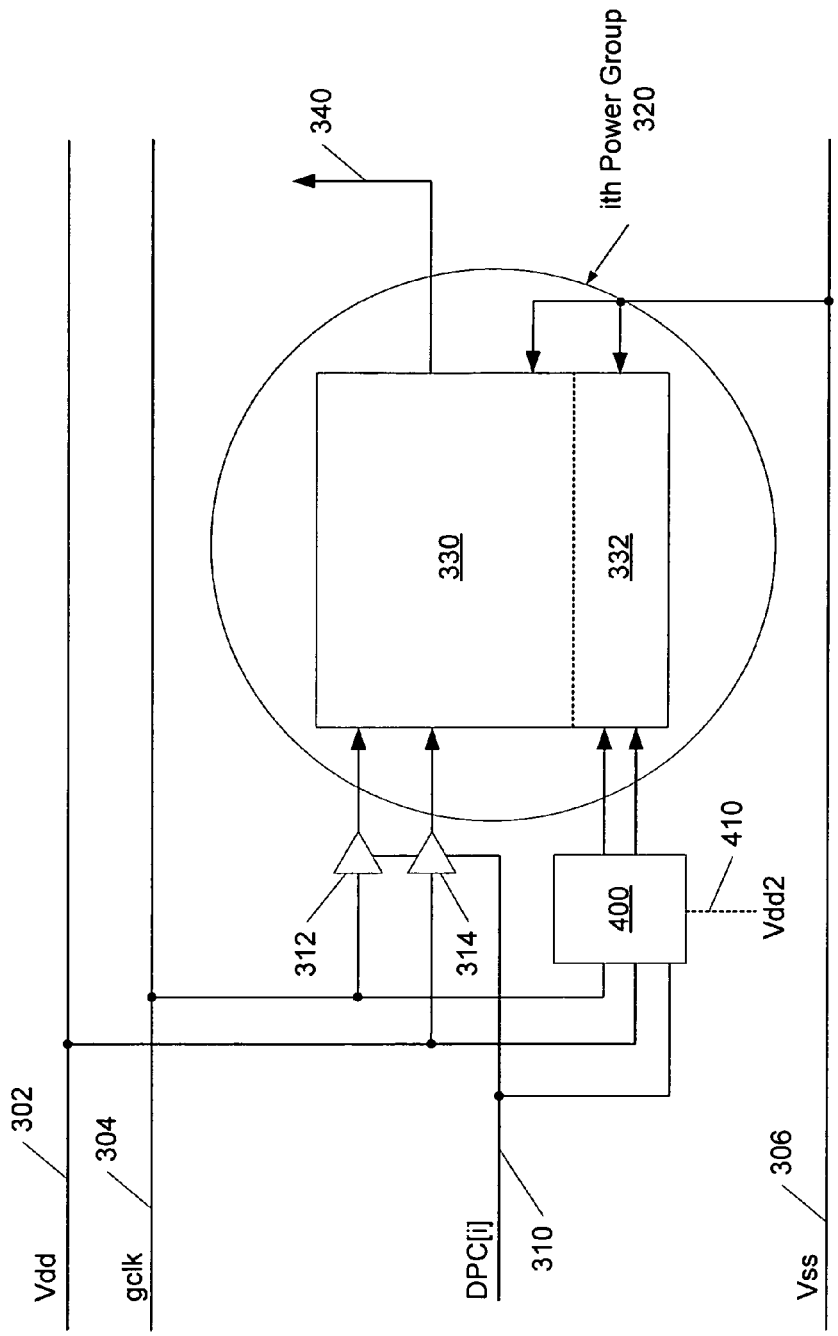
FIG. 4 depicts a portion of a power management mechanism.

FIG. 4 depicts an embodiment of circuitry similar to that of FIG. 3. Similar items in FIG. 4 have the same numbering as similar items in FIG. 3. In the embodiment of FIG. 4, additional circuitry 400 is coupled between supply voltage 302, gclk 304, and group 332 of power group 320. Generally speaking, circuitry 400 may configured to supply two or more power levels to group 332, while maintaining a minimum power level required to maintain a state of circuitry within group 332. In one embodiment, circuitry 400 may be coupled to receive more than one power supply. For example, circuitry 400 may be coupled to receive and convey both a power supply Vdd 302 which represents a higher supply voltage (e.g., 1V), and a power supply Vdd2 410 which represents a lower supply voltage (e.g., 250 mV). In this manner, circuitry 400 may select a power supply from two or more power supplies and convey the selected power supply to group 332. Alternatively, techniques are known which may be used to convey more than one power level from a single power supply. In such an embodiment, circuitry 400 may be coupled to receive only a single power supply (e.g., Vdd 302) and convey two or more power supply to group 332.

Figure 5:
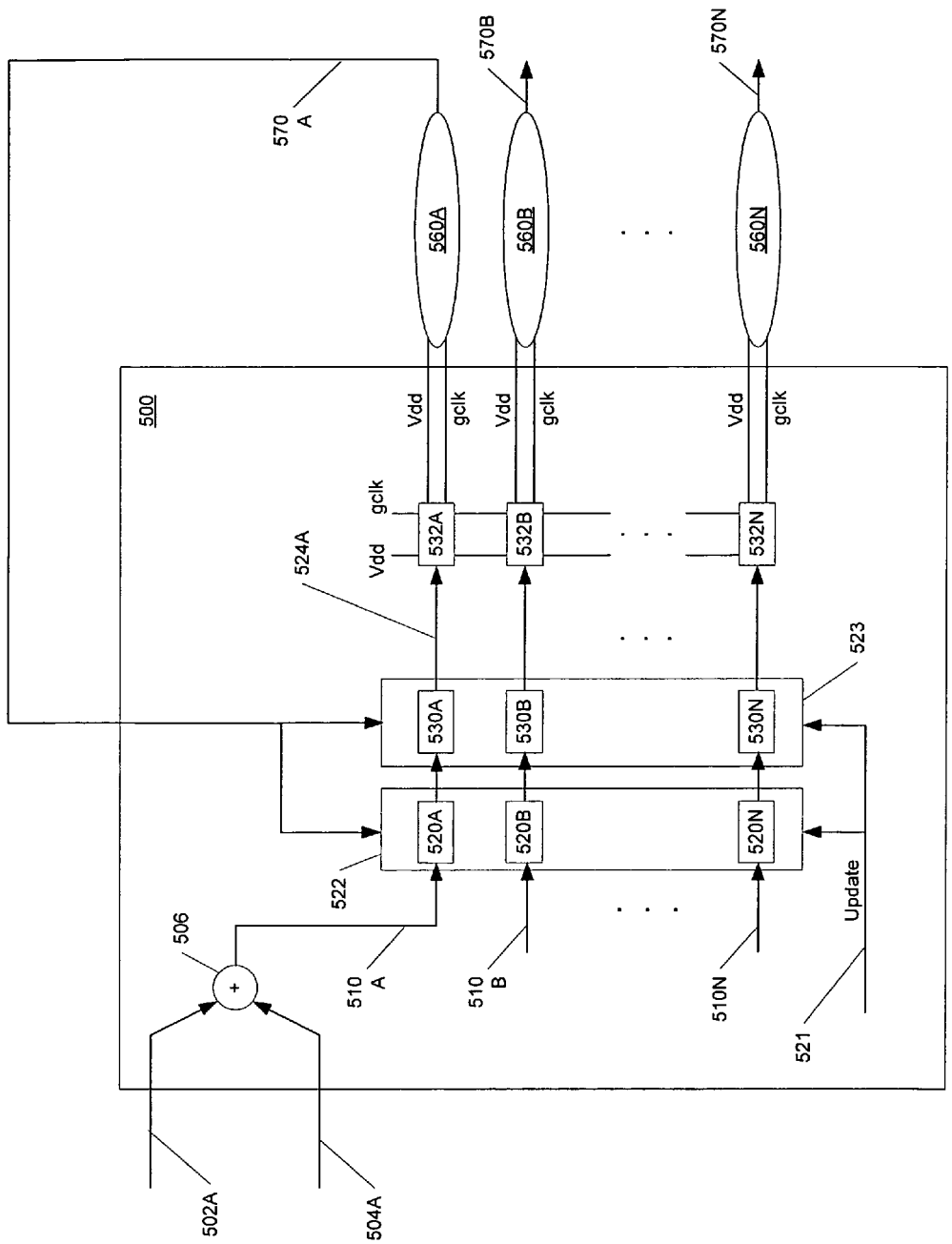
FIG. 5 depicts one embodiment of a dynamic power control mechanism and power groups.

Turning now to FIG. 5, one embodiment of a power management mechanism is depicted. In the embodiment shown, a plurality of power groups 560A-560N are shown coupled to receive a power supply (Vdd) and clock signal (gclk). The depicted power supplies Vdd and clock signals gclk may or may not represent a common power supply Vdd and/or clock signal gclk. Circuitry which may generally correspond to a dynamic power control unit (such as unit 240 in FIG. 2) is shown within block 500. However, in other embodiments, the various portion of logic and circuitry depicted in FIG. 5 may be placed within a variety of locations within a device or system. In the example shown, a storage device (e.g., a register) 522 is shown which is configured to store a power status indication for each of power groups 560. For example, entries 520A-520N may correspond to each of power groups 560A-560N, respectively. Storage device 522 may, though not necessarily, generally correspond to the storage device 280 of FIG. 2. In an embodiment wherein storage device 522 comprises a plurality of counters, an update signal 521 may be generated which is configured to decrement the counts as described above. Also shown for each of the power groups 560A-560N, are gating logic 532A-532N and indications 530A-530N.

In the embodiment shown, unit 500 is coupled to receive both an incoming indication 502A and a pending indication 504A corresponding to at least one power group 560A. Incoming indication 502A may be conveyed by a device such as microcode unit 200 of FIG. 2, while pending indication 504A may be conveyed from a device such as reorder buffer 220 of FIG. 2. Alternatively, in a non-microcode based device, such indications (502A, 504A) may be received from any suitable instruction scheduling mechanism(s), or otherwise. Unit 500 may generally be configured to receive incoming and/or pending indications for power groups 560B-560N as well. Each of gating circuits 532A-532N is configured to control whether a corresponding power group 560A-560N is powered and/or clocked, such as the tri-state gates (312 and 314) described in FIG. 4. In such an embodiment, each circuit 532 may then receive an enable/disable signal which controls the gating function. For example, signal 524A may represent an enable/disable signal for power group 560A. In one embodiment, signal 524A may correspond to signal 310 of FIG. 4.

Generally speaking, when an instruction is detected (e.g., early in a pipeline such as during decode) which requires power group 560A for operation, incoming indication 502A may be asserted. Pending indication 504A may be asserted while an instruction requiring power group 560A is pending (e.g., within the reorder buffer 220 of FIG. 2). Responsive to the signals 502A and 504A, circuit 506 conveys an indication 510A which indicates whether or not power group 560A may enter a reduced power state. For example, in one embodiment, circuit 506 may perform a logic OR function on the received values of signals 502A and 504A. If either of signals 502A or 504A is asserted, signal 510A is also asserted which may indicate that power group 560A may not enter a reduced power state. Similar indications 510B-510N may be generated for each of power groups 520B-520N, respectively.

In one embodiment, signal 510A may directly indicate whether a corresponding power group 560A may enter a reduced power state. In such an embodiment, if signal 510A is not asserted (i.e., neither an incoming instruction nor a pending instruction corresponding to power group 560A is detected), then signal 524A may be de-asserted which disables the output of Vdd and/or gclk from gating logic 532A. Entry 520A may then, in effect, store an enable/disable state for the corresponding power group 560A. In an alternative embodiment, power states may decay over time as described above. In one embodiment, each entry 520A-520N may store a count for a corresponding power group 560A-560N. Each count 520 may be decremented each cycle of a clock signal (e.g., gclk, or any other suitable clock signal) in response to an update signal 521, or any other suitable signal. Should a corresponding count reach a predetermined value, such as zero, the corresponding power group may enter a low(er) power state. For example, if a count in entry 520A is equal to zero, then enable/disable signal 524A may indicate the corresponding power group 560A may enter a low(er) power state.

In one embodiment, a separate state indication may be maintained for each of the power groups 560. For example, as shown in FIG. 5, both a count 520 and a state indication 530 (as shown within block 523) may be maintained for each power group. In such an embodiment, a corresponding state 530 is set in dependence upon a corresponding count 520 value. Therefore, if a count 520A is non-zero, then state 530A may indicated that power group 560A is to be powered. On the other hand, if count 520A reaches zero, then state 530A may be set to indicate that power group may enter a low(er) power state. In response to receiving an indication indicative of an incoming or pending instruction, the count for a corresponding power group(s) may be reset.

Also depicted in FIG. 5 is a status indication 570A-570N conveyed by each of power groups 560A-560N. Status indications 570 may indicate that a corresponding power group 560 may not enter a reduced power state and/or have its clocking disabled. For example, if status indication 570A indicates power group 560A may not enter a reduced power state, then signal 524A may be prevented from indicating a low(er) power state, irrespective of a value of entry 520A and/or 530A. Alternatively, indication 570A could be fed directly to gating logic 532A, or otherwise. Numerous such alternatives are possible and are contemplated.

As discussed above, instructions may include an indication as to one or more power groups that may be required for execution. Such an indication may be directly encoded as part of the instruction encoding, the power code indication could be determined via a mapping to instruction opcodes, or otherwise. A variety of techniques for associating power code indications with instructions or operations are possible and are contemplated. FIG. 6 illustrates one embodiment of power codes and their association with various instructions. A first table 600 is shown which includes a power group column 602 and corresponding power code ID 604. Each row of table 600 then includes one or more power manageable groups of logic/circuitry and a corresponding power code ID. In the example shown, a power code ID comprises eight bit. However, those skilled in the art will appreciate that other encodings are possible. All such alternatives are contemplated. A first entry indicates that the power code ID for an address generation unit (AGU) and load/store unit is "00000001". A second entry indicates that the power code ID for an arithmetic logic unit (ALU) is "00000010". Similar entries are included for a shifter, integer multiplier, floating point (FP) scheduler, FP adder, FP multiplier, and FP divide/squareroot unit. It is noted that the particular power groups within a given device will depend upon the type and nature of the device, design decisions, and so on. Accordingly, different power groups may exist for a particular general purpose microprocessor and application specific devices.

A second table 601 in FIG. 6 depicts sample instructions 612 with corresponding sample encodings which include a power code 614 and other bits 616. The first entry depicts and addop instruction which may be configured, for example, to add two operands together. In the example shown, addop has both a register and a memory operand. The power code for the instruction is "00000011". Based upon the associations illustrated by table 600, the power code "000000011" indicates that both the AGU, Load/Store power group and the ALU power group may be required. A second entry depicts a moveop instruction which may be configured to move data from one location to another. In the example shown, the moveop instruction includes two register operands. The power code for the moveop instruction is "00000010" which corresponds to the ALU power group. Finally, an fpaddop instruction is depicted in table 601. Such an instruction may correspond to an add operation in a floating point unit. In the example shown, the fpaddop instruction includes a floating point register operand (fpregister) and memory operand. The power code for the fpaddop instruction is "00110001" which corresponds to the shifter, and integer multiplier power groups. The other bits 616 corresponding to each of the illustrated instructions may provide any other suitable encoding bits for the instruction.

As an example of the identification of power groups which may be required for pending instructions, assume for purposes of discussion that the table 601 represents a portion of data stored in reorder buffer 220 of FIG. 2. Therefore, the instructions in table 601 generally represent pending instructions. Looking at the three instructions depicted (generally there may be more than three instructions), a logic OR operation may be performed on the power codes of the pending instructions. Accordingly, the following operation is performed with the result as illustrated in block 603.

00000011

00000010

<u>00110001</u>

00110011

Therefore, a power code of "00110011" is indicated for the pending instructions. As this power code corresponds to the AGU, LoadStore, ALU, shifter, and integer multiplier power groups. Accordingly, each of these power groups may be required and may not be powered down/off.

Figure 7:
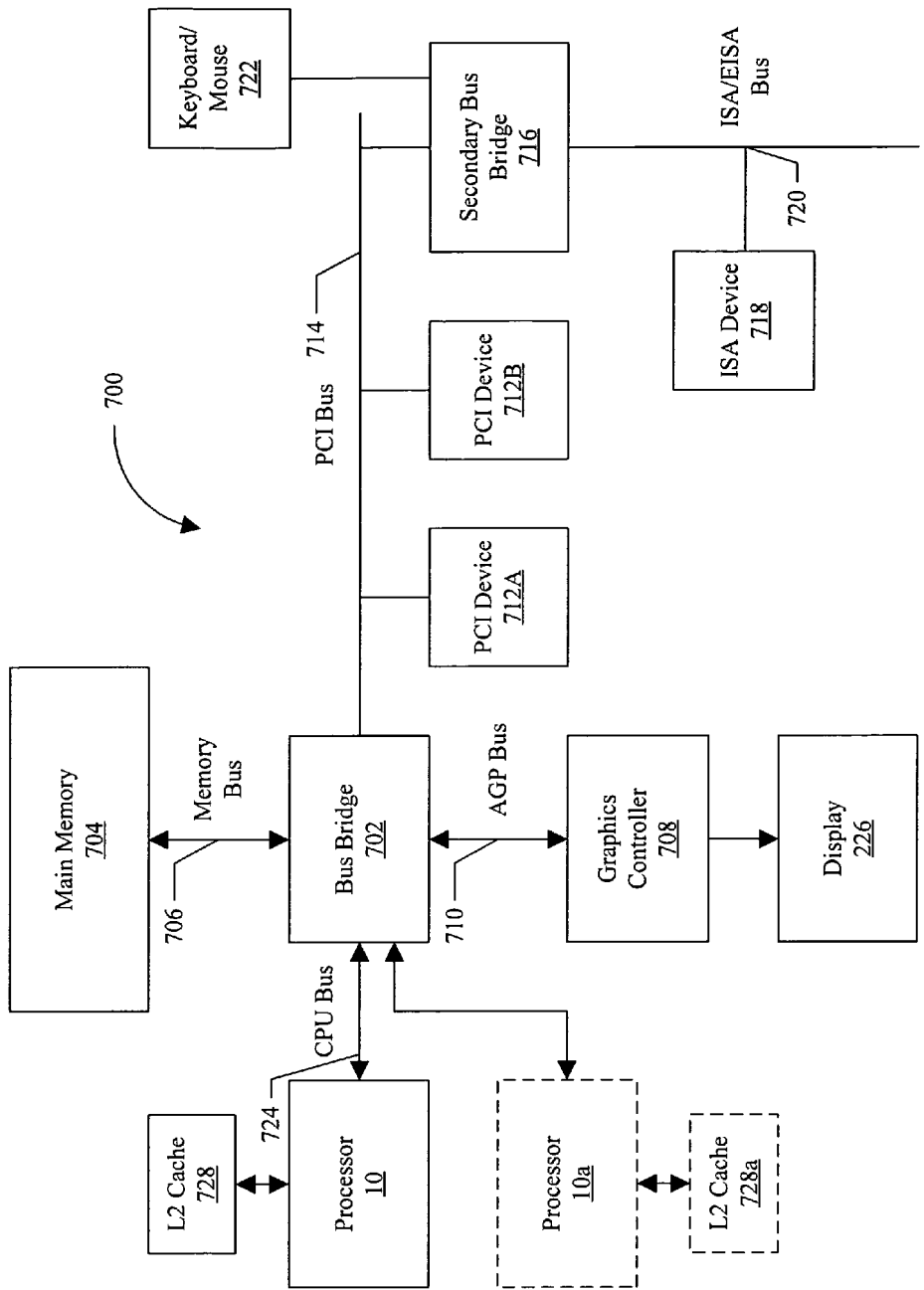
FIG. 7 is a block diagram of a second embodiment of a computer system including the processor shown in FIG. 1.

Turning now to FIG. 7, a block diagram of one embodiment of a computer system 700 including processor 10 coupled to a variety of system components through a bus bridge 702 is shown. Other embodiments are possible and contemplated. In the depicted system, a main memory 704 is coupled to bus bridge 702 through a memory bus 706, and a graphics controller 708 is coupled to bus bridge 702 through an AGP bus 710. Finally, a plurality of PCI devices 712A-712B are coupled to bus bridge 702 through a PCI bus 714. A secondary bus bridge 716 may further be provided to accommodate an electrical interface to one or more EISA or ISA devices 718 through an EISA/ISA bus 720. Processor 10 is coupled to bus bridge 702 through a CPU bus 724 and to an optional L2 cache 728. Together, CPU bus 724 and the interface to L2 cache 728 may comprise an external interface to which external interface unit 18 may couple.

Bus bridge 702 provides an interface between processor 10, main memory 704, graphics controller 708, and devices attached to PCI bus 714. When an operation is received from one of the devices connected to bus bridge 702, bus bridge 702 identifies the target of the operation (e.g. a particular device or, in the case of PCI bus 714, that the target is on PCI bus 714). Bus bridge 702 routes the operation to the targeted device. Bus bridge 702 generally translates an operation from the protocol used by the source device or bus to the protocol used by the target device or bus.

In addition to providing an interface to an ISA/EISA bus for PCI bus 714, secondary bus bridge 716 may further incorporate additional functionality, as desired. An input/output controller (not shown), either external from or integrated with secondary bus bridge 716, may also be included within computer system 700 to provide operational support for a keyboard and mouse 722 and for various serial and parallel ports, as desired. An external cache unit (not shown) may further be coupled to CPU bus 724 between processor 10 and bus bridge 702 in other embodiments. Alternatively, the external cache may be coupled to bus bridge 702 and cache control logic for the external cache may be integrated into bus bridge 702. L2 cache 728 is further shown in a backside configuration to processor 10. It is noted that L2 cache 728 may be separate from processor 10, integrated into a cartridge (e.g. slot 1 or slot A) with processor 10, or even integrated onto a semiconductor substrate with processor 10. L2 cache 728 may be protected by ECC data, and ECC errors in the L2 cache 728 may be corrected using a microcode routine (as described above) or in hardware, as desired.

Main memory 704 is a memory in which application programs are stored and from which processor 10 primarily executes. A suitable main memory 704 comprises DRAM (Dynamic Random Access Memory). For example, a plurality of banks of SDRAM (Synchronous DRAM) or Rambus DRAM (RDRAM) may be suitable.

PCI devices 712A-712B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 718 is illustrative of various types of peripheral devices, such as a modem, a sound card, and a variety of data acquisition cards such as GPIB or field bus interface cards.

Graphics controller 708 is provided to control the rendering of text and images on a display 726. Graphics controller 708 may embody a typical graphics accelerator generally known in the art to render three-dimensional data structures which can be effectively shifted into and from main memory 704. Graphics controller 708 may therefore be a master of AGP bus 710 in that it can request and receive access to a target interface within bus bridge 702 to thereby obtain access to main memory 704. A dedicated graphics bus accommodates rapid retrieval of data from main memory 704. For certain operations, graphics controller 708 may further be configured to generate PCI protocol transactions on AGP bus 710. The AGP interface of bus bridge 702 may thus include functionality to support both AGP protocol transactions as well as PCI protocol target and initiator transactions. Display 726 is any electronic display upon which an image or text can be presented. A suitable display 726 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 700 may be a multiprocessing computer system including additional processors (e.g. processor 10a shown as an optional component of computer system 700). Processor 10a may be similar to processor 10. More particularly, processor 10a may be an identical copy of processor 10. Processor 10a may be connected to bus bridge 702 via an independent bus (as shown in FIG. 7) or may share CPU bus 724 with processor 10. Furthermore, processor 10a may be coupled to an optional L2 cache 728a similar to L2 cache 728.

Various embodiments may further include receiving, sending or storing instructions and/or data implemented in accordance with the foregoing description upon a computer readable medium. A computer readable medium may include storage media or memory media such as magnetic or optical media, e.g., disk, DVD or CD-ROM, volatile or non-volatile media such as RAM (e.g. SDRAM, RDRAM, SRAM, etc.), ROM, etc. In addition, it is noted that various embodiments above may be used separately from other embodiments, or may be used in combination with one or more other embodiments, as desired. Furthermore, an embodiment combining the operation of all the above embodiments is contemplated.

Numerous variations and modifications will become apparent to those skilled in the art once the above disclosure is fully appreciated. While the above description generally describes the methods and mechanisms within the context of a general purpose microprocessor, the methods and mechanisms are applicable to any device in which power management my be desired—such as routers, switches, graphics devices, bridge chips, portable devices, and so on. It is intended that the following claims be interpreted to embrace all such variations and modifications.

What is claimed is:

1. An apparatus comprising:
one or more power manageable groups; and
a power management unit configured to:
    detect an instruction is scheduled for execution;
    identify at least one power group of the one or more power manageable groups which may be required for execution of the instruction; and
    convey a first indication which prevents the at least one power group from entering a powered off state, in response to detecting said instruction; and
    convey a second indication which enables the at least one power group to enter a powered off state, in response to determining an instruction corresponding to the at least one power group has not been scheduled for execution for a predetermined period of time;
    wherein the at least one power group is configured to automatically enter a power off state in the absence of said first indication.

2. The apparatus as recited in claim 1, wherein detecting an instruction is scheduled for execution comprises detecting an instruction is either incoming and/or pending.

3. The apparatus as recited in claim 1, where said second indication is further configured to cause clocking of the at least one power group to be disabled.

4. The apparatus as recited in claim 1, wherein the at least one power group comprises a first portion of circuitry which may be powered off, and a second portion of circuitry which may not be powered off.

5. The apparatus as recited in claim 4, wherein in response to receiving an indication that the at least one power group may be powered off, the first portion may enter a powered off state, and the second portion may enter a reduced power state which is not a powered off state.

6. The apparatus as recited in claim 1, wherein the power management unit is configured to:
    maintain a plurality of counts, each of which corresponds to one of the power manageable groups;
    decrement each of said plurality of counts each cycle of a received clock signal; and
    reset a first count of the plurality of counts to a maximum value, in response to detecting an instruction corresponding to a power group to which the first count corresponds is scheduled for execution.

7. The apparatus as recited in claim 1, wherein said at least one power group is configured to convey a status indication to the power management unit, wherein when asserted the status indication prevents the at least one power group from entering a powered off state.

8. The apparatus as recited in claim 1, wherein an encoding of the instruction includes an identification of said at least one power group.

9. A method for managing power in an electrical device, the method comprising:
- detecting an instruction is scheduled for execution;
- identifying at least one power group of one or more power manageable groups which may be required for execution of the instruction;
- conveying a first indication which prevents the at least one power group from entering a powered off state, in response to detecting said instruction;
- conveying a second indication which enables the at least one power group to enter a powered off state in response to determining an instruction corresponding to the at least one power group has not been scheduled for execution for a predetermined period of time; and
- automatically entering a power off state in the absence of said first indication.

10. The method as recited in claim 9, wherein detecting an instruction is scheduled for execution comprises detecting an instruction is either incoming and/or pending.

11. The method as recited in claim 9, wherein in response to detecting said second indication, the method further comprises causing clocking of the at least one power group to be disabled.

12. The method as recited in claim 11, wherein the at least one power group comprises a first portion of circuitry which may be powered off, and a second portion of circuitry which may not be powered off, and wherein in response to receiving an indication that the at least one power group may be powered off, the method further comprises causing the first portion to enter a powered off state and causing the second portion to enter a reduced power state which is not a powered off state.

13. The method as recited in claim 9, further comprising:
- maintaining a plurality of counts, each of which corresponds to one of the power manageable groups;
- decrementing each of said plurality of counts each cycle of a received clock signal; and
- resetting a first count of the plurality of counts to a maximum value, in response to detecting an instruction corresponding to a power group to which the first count corresponds is scheduled for execution.

14. The method as recited in claim 9, further comprising receiving a status indication from the at least one power group, wherein when asserted the status indication prevents the at least one power group from entering a powered off state.

15. The method as recited in claim 9, wherein an encoding of the instruction includes an identification of said at least one power group.

\* \* \* \* \*

UNITED STATES PATENT AND TRADEMARK OFFICE
CERTIFICATE OF CORRECTION

PATENT NO. : 7,644,294 B2
APPLICATION NO. : 11/327606
DATED : January 5, 2010
INVENTOR(S) : Preetham Raghuvanshi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Sixteenth Day of November, 2010

David J. Kappos
*Director of the United States Patent and Trademark Office*